US006550492B2

(12) United States Patent
Shaw et al.

(10) Patent No.: US 6,550,492 B2
(45) Date of Patent: Apr. 22, 2003

(54) FILTER VENT FITTING

(75) Inventors: Mark D. Shaw, Ponte Vedra Beach, FL (US); J. Tad Heyman, Atlantic Beach, FL (US); Laurence M. Bierce, Macclenny, FL (US)

(73) Assignee: UltraTech International, Inc., Jacksonville, FL (US)

( * ) Notice: Subject to any disclaimer, the term of this patent is extended or adjusted under 35 U.S.C. 154(b) by 153 days.

(21) Appl. No.: 09/732,694

(22) Filed: Dec. 8, 2000

(65) Prior Publication Data

US 2002/0069936 A1 Jun. 13, 2002

Related U.S. Application Data

(60) Provisional application No. 60/169,712, filed on Dec. 8, 1999.

(51) Int. Cl.[7] .................................................. F16K 24/00

(52) U.S. Cl. .......................... 137/318; 55/385.4; 73/52; 137/321; 137/550; 137/588

(58) Field of Search ............................ 55/385.4; 73/52; 137/318, 321, 550, 588

(56) References Cited

U.S. PATENT DOCUMENTS 3,349,792 A * 10/1967 Larkin ........................ 137/318
4,957,522 A * 9/1990 Brassell ...................... 55/385.4
6,065,488 A * 5/2000 Garcia et al. ............... 137/318

* cited by examiner

*Primary Examiner*—Gerald A. Michalsky
(74) *Attorney, Agent, or Firm*—Thomas C. Saitta

(57) ABSTRACT

A filter vent fitting for a drum which allows for the passage of hydrogen gas but precludes the passage of radioactive particulates, the fitting having evacuation/pressurization conduits which allow the drum to be evacuated or pressurized, and cryogenic/sapling conduits which allow the temperature of the drum to be reduced and samples drawn from the interior which are not filtered. Preferably a cap member is provided with a pressure balancing bore which is active during the evacuation and pressurization steps.

40 Claims, 5 Drawing Sheets

FILTER VENT FITTING

This application claims the benefit of U.S. Provisional Patent Application Serial No. 60/169,712, filed Dec. 8, 1999.

BACKGROUND OF THE INVENTION

This invention relates generally to the field of fittings which provide a passageway through a wall member for the passage of gases or other fluids, and more particularly to such fittings adapted for use with drums or other generally closed containers. Even more particularly, the invention relates to such fittings which include a selective filter in the passageway to prevent passage of certain matter. Still even more particularly, the invention relates to such fittings which allow for the passage of hydrogen gas but preclude the passage of radioactive particulates.

Hazardous wastes such as radioactive or chemical hazardous wastes, or in particular transuranic (TRU) wastes comprising radioactive elements, are currently typically disposed of by packing the wastes inside large drums, such as 55 gallon cylindrical plastic or metal drums, which are either closed in an air-tight manner such that no gases or other matter can escape from the containment, or are closed in a vented manner such that some gases are allowed to vent. In either case it is required that no radioactive material or substance can escape from the containment. The drums are then shipped to remote storage facilities for final storage, where they are stored underground or in specially designed structures. In many circumstances radiolysis (chemical decomposition brought about by radiation), chemical reactions or organic decomposition of the material placed within the drums creates hydrogen and/or other undesirable gases, resulting in a build-up over time of excessive amounts of hydrogen and/or other gases within the drum which if not addressed can lead to the formation of potentially explosive conditions. For example, it is potentially dangerous if the percentage of hydrogen gas exceeds five percent of the drum atmosphere. To address this serious problem, it is known to provide the storage drums with selective venting filters or other such devices which allow passage of hydrogen gases while retaining radioactive particulates within the drums. Unfortunately, many times the hazardous waste is first confined within inner layers of confinement, such as heat sealed, tied or knotted plastic bags made of relatively thin, flexible, relatively elastic, polyethylene (PE), polyurethane (PU) or polyvinyl chloride (PVC), cans or other rigid walled containers, or the like, which are then placed within the large drums, and a single drum will often contain multiple bags or other inner containers. Sometimes a quantity of hazardous waste is placed into two or more bags, with the first bag sealed and placed within the second, which is then sealed, etc. This results in an inner containment device with multiple layers of confinement. The drum itself forms the outer or primary layer of confinement and the inner containers form inner or secondary layers of confinement for the hazardous waste. Because the plastic bags and other inner containers are sealed and are by their nature impermeable to the gases which are formed over time, the gases are trapped and cannot pass through any venting devices provided for the drum, and undesirable or dangerous hydrogen gas build-up may occur within the drum.

In addition to the problem set forth above, some drums are provided with rigid internal polyethylene liners. In this case the drum forms the primary layer of confinement and the rigid internal liner forms a secondary containment layer.

Government transportation regulations promulgated by the Department of Energy, the Nuclear Regulatory Commission and other agencies require that where flexible inner layers of confinement are present within a drum, i.e., individual sealed bags or other containers, the amount of fissile hazardous material or the total waste wattage must be significantly limited in each drum. These regulations significantly increase shipping costs and require that excess amounts of fissile hazardous material or excess total waste wattage in a single drum must be repackaged into multiple drums. The current approach to this task involves opening the drums, physically breaching all the inner containers and then repackaging the containers within the drum or dispersing the containers into multiple drums. The bags cannot be merely punctured or slit, since the openings could be blocked upon repacking, resulting in entrapment of any new gases formed over time. Because of the hazardous nature of the materials involved, this process is extremely expensive due to the need to protect the workers from excessive exposure and due to the need to safely handle and isolate the hazardous materials from the environment during this operation, and costs for this type of operation can exceed $10,000 per drum. The amount of radioactive waste which can be put into a single drum having inner layers of confinement is severely restricted since if excess radioactive waste is stored in the drum, the drum will have to be opened and processed. For example, 20 grams of plutonium waste may be confined within a single drum under the guidelines where no inner containers are present, but only 2 grams of plutonium waste is allowed if there are inner containers. There are currently an estimated 800,000 drums containing radioactive TRU waste which require venting and subsequent storage. Current regulations preclude transport of the drums unless the drums contain less than five percent hydrogen gas.

It is an object of this invention to provide a filter vent fitting of novel structure for disposition on a drum, the filter vent allowing for the passage of certain fluids (gas or liquid) while preventing the passage of radioactive particles, which cooperates with means to safely breach the inner containment layers within a larger containment drum at relatively low cost, without requiring the opening of the drum and the handling and repackaging of the inner containers. It is a further object to provide a filter vent fitting which cooperates with such breaching means to perform this task in a manner which significantly reduces or removes worker exposure to the hazardous material, which can be performed at remote and various sites, which poses little or no threat for environmental release, which does not damage or degrade the drum, which does not cause chemical reactions within the drum, which functions on either PE, PU or PVC bags, which accounts for the problems created by rigid PE liners and sealed rigid-wall cans, and which breaches the inner containers in such manner that openings formed in the containers will not be blocked so that any gases which are produced over time subsequent to the initial venting and breaching operation will not be trapped by the inner containers but will vent in routine manner through venting devices. It is a further object to provide such a filter vent fitting which allows the interior of the drum to be evacuated or pressurized, and which allows liquid nitrogen or other cryogenic substance to be introduced into the drum to reduce the interior temperature. It is a further object to provide such a filter vent fitting which is self-drilling, self-tapping and self-sealing. It is a further object to provide such a filter vent fitting which also comprises pressure balancing means to maintain the pressure differential between the interior of the drum and the exterior of the drum disposed within a secondary chamber means within an acceptable pressure differential value.

SUMMARY OF THE INVENTION

The invention is a filter vent fitting adapted for use with drums or like closed containers to provide passageways through the wall or lid of the drum for selective passage of certain gases or liquids, while precluding passage of certain other substances, in particular radioactive particulates. The fitting is preferably self-drilling, self-tapping and self-sealing. The fitting comprises in general filter means which allows the passage of hydrogen and other gases while preventing the passage of radioactive particulates, such as a filter composed of sintered stainless steel, venting conduit means which allows gas produced within the drum to vent to the ambient and which allows gas to be introduced into or evacuated from the drum through said fitting in order to alter the interior pressure of the drum, and cryogenic/sampling conduit means which allows cryogenic substances, such as liquid nitrogen, to be introduced into the drum and gas samples to be extracted from the drum without passing through the filter media. The fitting is preferably provided with drilling means for breaching the lid of the drum, cutting means for creating an aperture in the drum lid to receive the fitting, fitting attachment means for securing the fitting to the drum, and sealing means to seal the junction between the fitting and the drum.

In a preferred embodiment, the fitting further comprises a cap member adapted to be secured to the fitting, with the cap member having evacuation/pressurization conduit means in fluid communication with the venting conduit means of the fitting, evacuation/pressurization connection means for joining the cap member to an evacuation or pressurization means, cryogenic/sampling conduit means in fluid communication with the cryogenic/sampling conduit means of the fitting, cryogenic/sampling connection means for joining the cap member to a cryogenic source or sampling means, and a pressure balancing bore in fluid communication with the evacuation/pressurization conduit means through which gases external to the fitting can be drawn during evacuation of the drum or through which pressurized gas can be expelled during pressurization of the drum. The volume of gases drawn into or expelled from the pressure balancing bore is a minor percentage of the total gas evacuated from or introduced into the drum.

DETAILED DESCRIPTION OF THE INVENTION

With reference to the drawings, the invention will now be described in detail with regard for the best mode and the preferred embodiment. In general, the invention is a combination filter and venting fitting adapted for use on a drum or other solid-walled container, the filter vent fitting providing passageways between the interior and the exterior of the drum through which fluids such as gases and liquids may pass under controlled circumstances. More particularly, the filter vent fitting allows for the passage of hydrogen gas while retaining radioactive particulates through a filtered passageway, and further allows for the passage of liquid nitrogen or other cryogenic substances and unfiltered gas samples through a second valved passageway.

Figure 1:
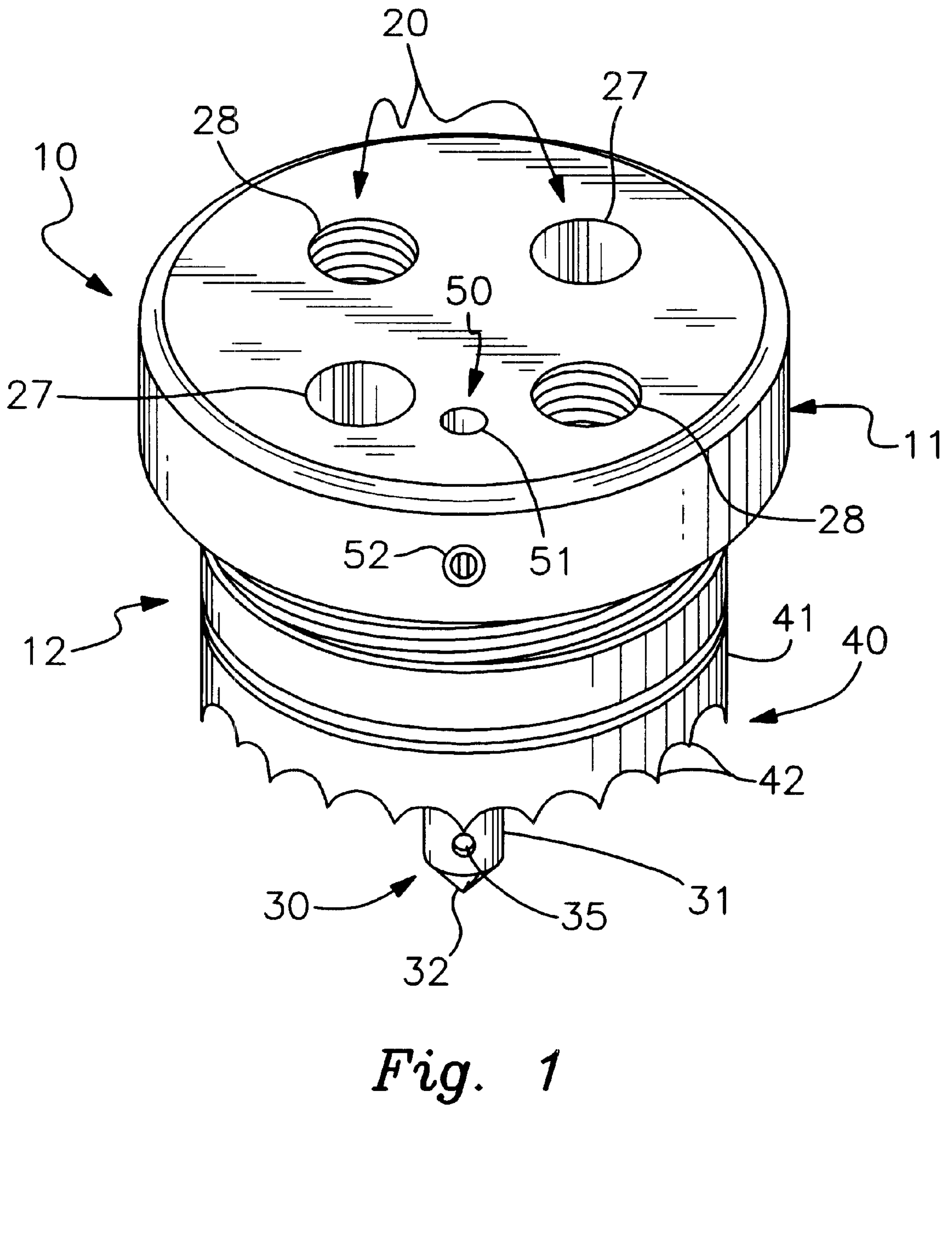
FIG. 1 is a perspective view of the fitting.
Figure 2:
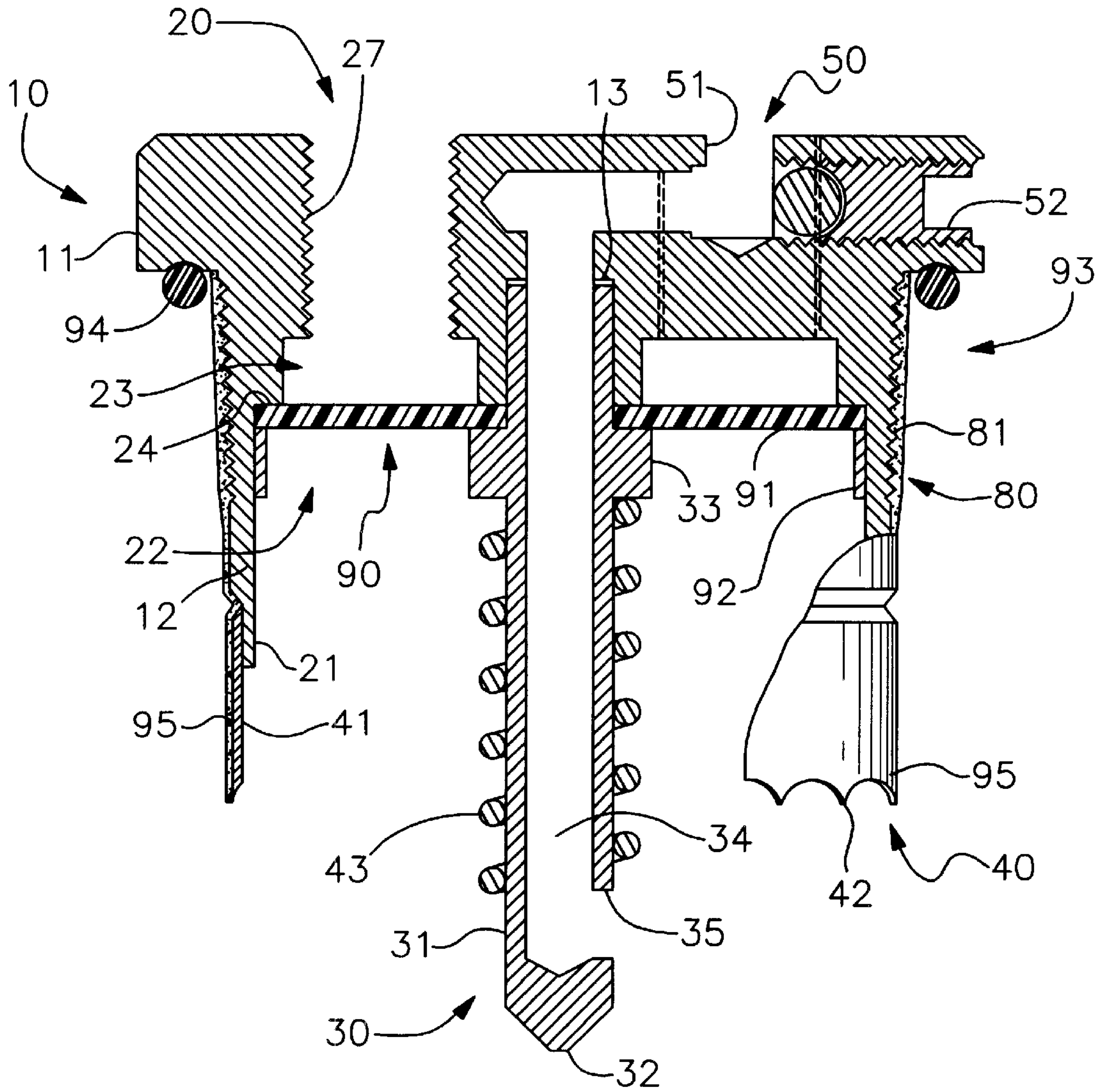
FIG. 2 is a cross-sectional view of the fitting.
Figure 3:
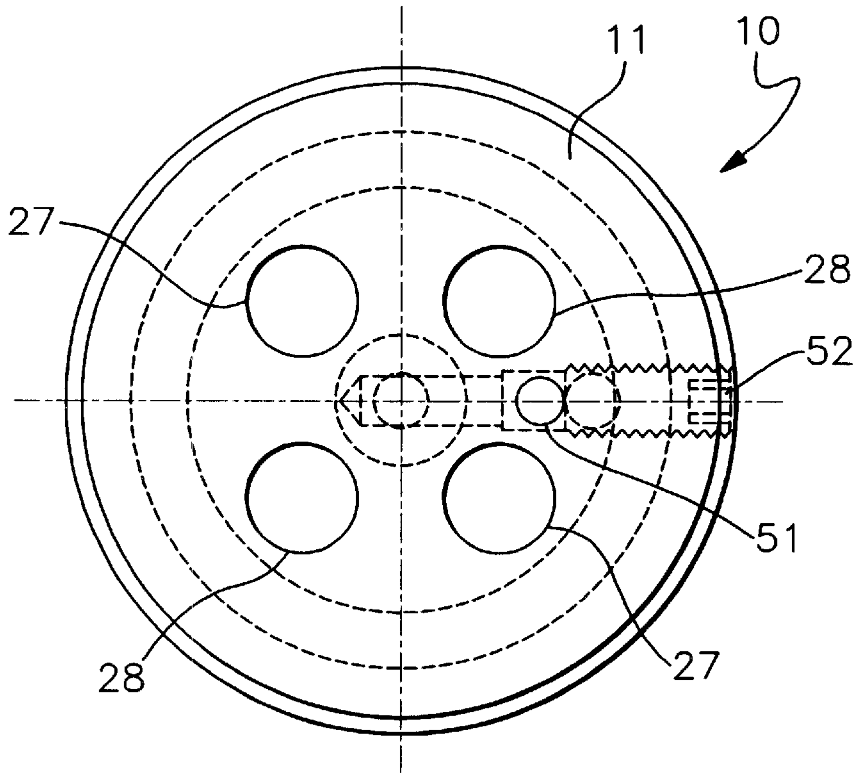
FIG. 3 is a top view of the fitting.
Figure 4:
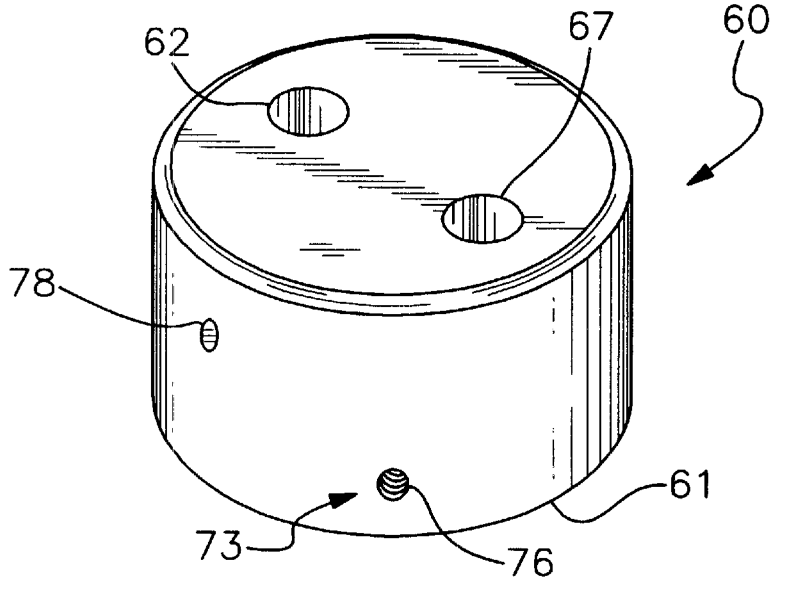
FIG. 4 is a perspective view of the cap member.
Figure 5:
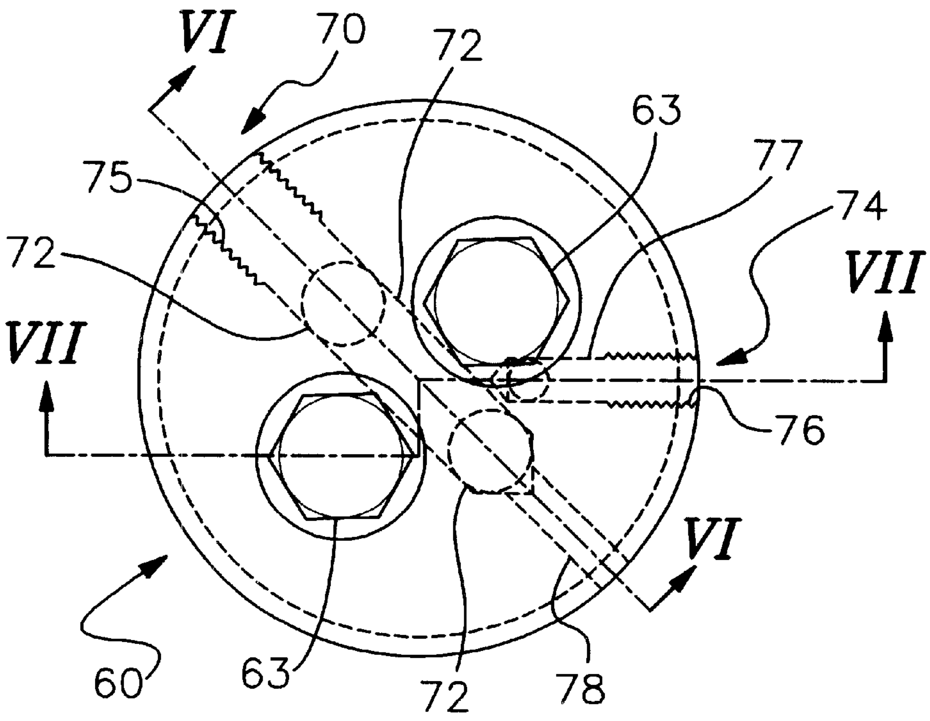
FIG. 5 is a top view of the cap member.
Figure 6:
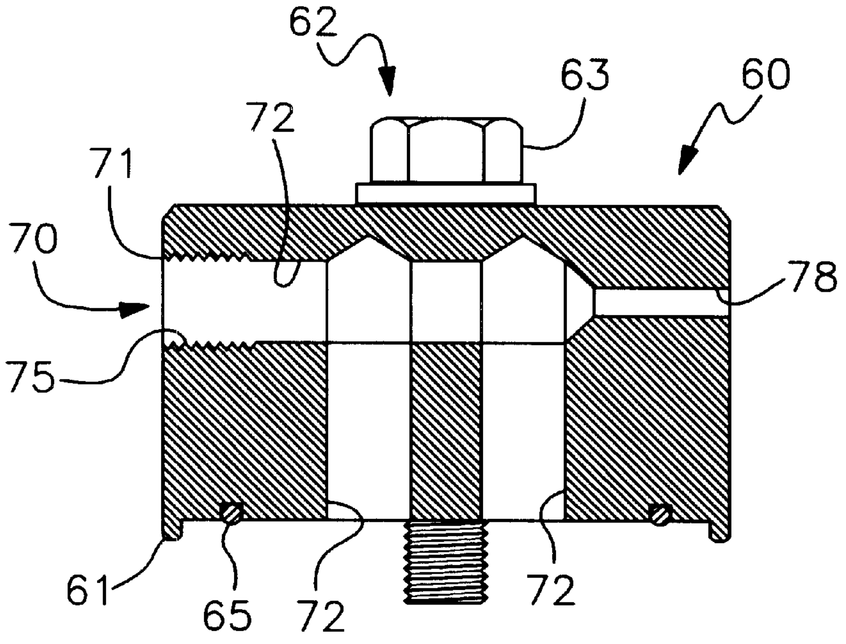
FIG. 6 is a cross-sectional view of the cap member taken along line B—B of FIG. 3.

As shown in FIGS. 1 through 3, the filter vent fitting 10 comprises a top flange or head member 11 and an annular body member 12, with the head 11 being of greater diameter than the body 12 so that the head 11 abuts the outer surface of a drum lid when the fitting 10 is attached to the drum. The fitting 10 comprises means 80 to attach the fitting 10 to the drum, which as shown are self-tapping threading 81, which will securely mate with any pre-existing openings provided in the drum lid. Preferably, fitting 10 further comprises drilling means 30 for breaching the lid of the drum and for breaching any rigid inner liners which may be present in the drum, and hole cutting means 40 for creating a circular opening in the drum lid, such that the fitting 10 is self-drilling. With this structure, a pre-existing hole is not required. The fitting 10 is attached by rotating the fitting 10 such that the drilling means 30 penetrates the drum lid. Drilling means 30 comprises as shown a drill bit 31 with cutting tip 32, the drill bit 31 being coaxially mounted in the central bore 13 of annular body 12. The cutting tip 32 extends a short distance beyond the cutting teeth 42 of the hole cutting means 40. Once the drilling means 30 passes through the drum lid, the hole cutting means 40 contacts the surface of the drum lid. Hole cutting means comprises an annular cutting sleeve 41 which is mounted onto the cutting means receiving rim 21 of the annular body 12, the cutting sleeve 41 being provided with teeth 42. Hole cutting means 40 creates a circular opening in the drum lid. Preferably, spring member 43 is coaxially disposed about the drill bit 31, such that spring member 43 will eject the disk portion of the drum lid to prevent blockage or restriction of the venting conduit means 20. Cutting sleeve 41 is sized such that the circular opening created is the optimum size to sealingly receive the self-tapping threads 81. Most preferably, sealing means 93 comprising a wax layer 95, or layer of similar material, is provided on the exterior of the cutting sleeve 41 such that the wax melts and creates a gas impermeable seal as the cutting operation is being performed. The sealing means 93 further comprises an O-ring gasket seal 94 which is disposed about the annular body 12 beneath the fitting head 11, such that the O-ring 94 is compressed against the drum lid when the fitting 10 is fully screwed into the drum lid. As shown, cutting means 40 is a separate element which is attached by press-fitting or the like onto the annular body 12, which allows the cutting sleeve 41 and teeth 42 to be composed of a harder material than the fitting body 12, but it is to be understood that the cutting means 40 could be formed integral to the annular fitting body 12.

Fitting 10 is provided with venting conduit means 20 which define passageways through the fitting 10. Venting conduit means 20 comprise a lower annular venting chamber 22 and an upper annular venting chamber 23. Vent ports 27 are in fluid communication with the upper annular venting chamber 23, and as shown comprise four members. Vent ports 27 are non-threaded, while vent ports 28 are threaded to provide a structure for attachment of conduit fittings for evacuation or pressurization conduits, and to provide a structure for the attachment of a cap member 60 as described below. The combination of vent ports 27 and 28, the upper annular venting chamber 23 and the lower annular venting chamber 22 provides a passageway for the venting of gases from the interior of the drum, provides a pressurization passageway for the introduction of pressurized gas to raise the interior pressure of the drum, and provides an evacuation passageway for the removal of gases from the drum to lower the pressure within the drum.

The fitting 10 is provided with a selective filter means 90 which allows the passage of selected matter but precludes the passage of other matter. In particular, the filter means 90 preferably allows for the passage of hydrogen gas but precludes the passage of radioactive particulates, and as shown comprises a disk-shaped filter member 91, composed for example of sintered stainless steel of the type well known in the industry and suited for this purpose. The filter 91 is disposed between the upper venting chamber 23 and the lower venting chamber 22 between filter abutment shoulder 24, drill bit collar member 33 and filter retention ring 92. Other support materials, such as wire mesh or the like, may also be provided to support the filter 91. Thus filter means 91 operates on all matter passing through the venting chambers 22 and 23 and the venting ports 27 and 28. Preferably the filter means 90 has a 10 times diffusion rating of $3.7\times10^{-5}$ for maximum wattage limits and plutonium gram loading per drum.

Fitting 10 is also provided with a combination cryogenic and gas sampling conduit means 50 which defines another passageway through the fitting 10, such that cryogenic matter, such as liquid nitrogen, may be introduced into the drum to lower the temperature within the drum or to allow for gas head samples to be taken from the interior of the drum without the need for opening or breaching the drum. The cryogenic/sampling conduit means 50 comprises a valved conduit 51 having a valve means 52 for opening and closing the valved conduit 51. Preferably, valved conduit 51 communicates with an axial or longitudinal bore 34 disposed within the drill bit 31, the axial bore 34 communicating with a radial aperture 35, such that a passageway is created from the interior of the drum through the drill bit 31 and out the head 11 of the fitting 10. The cryogenic/sampling conduit means 50 bypasses the filter means 90, such that there is no impediment to introduction of liquid nitrogen and such that gas samples drawn from the drum are not filtered.

Figure 7:
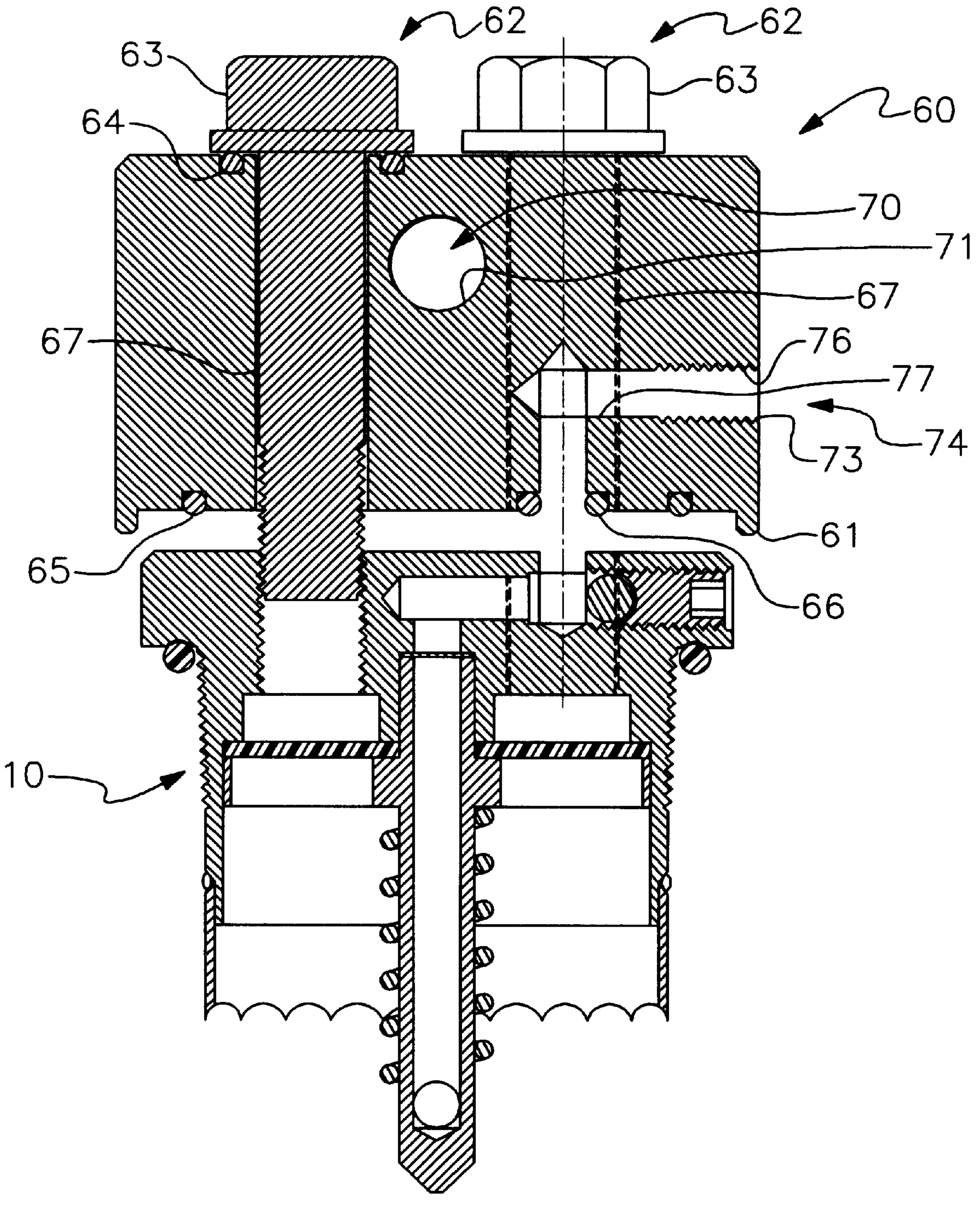
FIG. 7 is a cross-sectional view of the cap member in the process of being joined to the fitting taken along line A—A of FIG. 3.

In the preferred embodiment, the invention further comprises a cap member 60 which is adapted to be attached to the fitting 10, as illustrated in FIGS. 4 through 7. Cap member 60 comprises attachment means 62 for securing the cap member 60 to the fitting 10, which as shown comprises one or more threaded bolts 63 which are inserted through bores 67. The bolts 63 extend beyond the cap member 60 and mate with the threaded vent ports 28 of the fitting 10, as shown in FIG. 7, thereby securing the cap member 60 in a removable manner. Bolt O-ring seals 64 are disposed between the bolts 63 and the top of the cap member 60 such that gas is precluded from passing through the bores 67. Cap member 60 further preferably comprises a junction O-ring seal 65 disposed on the bottom of the cap member to seal the junction between the cap member 60 and the fitting 10, and also further preferably comprises an annular lip 61 for properly aligning the cap member 60.

Cap member 60 further comprises conduit means 70 to evacuate and pressurize the interior of the drum in conjunction with the vent ports 27 and annular venting chambers 22 and 23, with evacuation/pressurization conduit means 70 comprising an evacuation/pressurization port 71 provided with connection means 75, such as internal threading, for joining a conduit fitting from an evacuation or pressurization conduit and communicating bores 72 connected to port 71 which align with the vent ports 27 when the cap member 60 is connected to the fitting 10. Most preferably the evacuation/pressurization conduit means 70 further comprises a pressure balancing bore 78 of smaller diameter than the vent port communicating bores 72, where the pressure balancing bore 78 is open to the exterior of the cap member 60. Pressure balancing member 78 defines a two-way conduit which serves to balance the pressure external to the cap member 60 and the drum to that of the interior of the drum. When gas is being evacuated from the drum through the venting conduit means 20 and evacuation/pressurization conduit means 70, a small amount of gas is drawn into the cap member 60 from the area immediately outside the drum. By providing a closed chamber which receives the drum during the operation, the pressure in the area within the chamber but external to the drum can be maintained within an acceptable maximum pressure differential value relative to the pressure inside the drum. Conversely, when the drum is being pressurized by introducing gas into the drum through the evacuation/pressurization conduit means 70 and the venting conduit means 20, a small amount of the pressurized gas is expressed through the pressure balancing bore 78 into the chamber during the pressurization operation, again insuring that the acceptable maximum pressure differential value is not exceeded.

The cap member 60 also further comprises conduit means 74 to deliver a cryogenic substance or to draw gas samples from the interior of the drum in conjunction with the cryogenic/sampling conduit means 50 of the fitting 10, and in particular with the valved conduit 51, axial bore 34 and radial aperture 35 within the drill bit 31. Cryogenic/sampling conduit means 74 comprises a cryogenic/sampling port 73 connected to a communicating bore 77 which aligns with and communicates with the opening for the valved conduit 51 in the fitting 10 when the cap member 60 is properly attached. An O-ring seal 66 is disposed about the bottom opening of the bore 77. Cryogenic/sampling connection means 76, such as internal threading, is preferably provided for joining a conduit fitting from cryogenic source or gas sampling conduits. The combination of the cryogenic/sampling conduit means 74 with the fitting cryogenic/sampling conduit means 50 provides a passageway for the introduction of liquid nitrogen or similar material to reduce the temperature within the drum and provides a passageway for the removal of gas samples from the interior of the drum, where the cryogenic material and gas samples bypass the filter means 90.

By providing a separate cap member 60 from the fitting 10, the fitting 10 can be connected to the drum and allowed to remain in place as the required venting mechanism for hydrogen gases. When gas samples need to be taken or when an evacuation or pressurization operation is to be performed on the drum, the cap member 60 can be temporarily attached, then removed after the operations have been completed. Alternatively, means to directly connect the conduit fittings of evacuation/pressurization conduits, cryogenic conduits and gas sampling conduits may be provided in the vent ports 27 or 28 and the cryogenic/sampling valved conduit 51.

It is understood that equivalents and substitutions for certain elements set forth above may be obvious to those skilled in the art, and thus the true scope and definition of the invention is to be as et forth in the following claims.

We claim:

1. A filter vent fitting adapted for use with a drum, said fitting comprising:

filter means which allows the passage of hydrogen and other gases while preventing the passage of radioactive particulates;

venting conduit means which allows gas produced within the drum to vent to the ambient through said filter means and which allows gas to be introduced into or evacuated from the drum through said fitting; and cryogenic/sampling conduit means which allows cryogenic substances to be introduced into the drum and gas samples to be extracted from the drum.

2. The fitting of claim 1, further comprising:

drilling means for breaching the lid of the drum;

hole cutting means for creating an aperture in the drum to receive said fitting;

fitting attachment means for securing said fitting to the drum; and sealing means to seal the junction between the fitting and the drum.

3. The fitting of claim 2, further comprising a cap member adapted to be secured to the fitting, said cap member comprising:

evacuation/pressurization conduit means in fluid communication with said venting conduit means of said fitting;

evacuation/pressurization connection means for joining said cap member to an evacuation or pressurization means;

cryogenic/sampling conduit means in fluid communication with said cryogenic/sampling conduit means of said fitting;

cryogenic/sampling connection means for joining said cap member to a cryogenic source or sampling means; and a pressure balancing bore in fluid communication with said evacuation/pressurization conduit means and opening external to said cap member through which gases external to said fitting can be drawn during evacuation of said drum or through which pressurized gas can be expelled during pressurization of said drum.

4. The fitting of claim 3, wherein said cryogenic/sampling conduit means bypasses said filter means.

5. The fitting of claim 4, wherein said cryogenic/sampling conduit means bypasses said filter means passes through said drilling means.

6. The fitting of claim 4, wherein said drilling means comprises a drill bit and wherein said cryogenic/sampling conduit means comprises a valved conduit, an axial bore disposed within said drill bit, and a radial aperture disposed within said drill bit.

7. The fitting of claim 3, wherein said fitting attachment means comprises self-tapping threading.

8. The fitting of claim 3, wherein said venting conduit means comprise vent ports and annular venting chambers.

9. The fitting of claim 8, wherein said venting conduit means comprises an upper annular venting conduit and a lower annular venting conduit, and wherein said filter means is disposed between said upper annular venting conduit and said lower annular venting conduit.

10. The fitting of claim 9, wherein said filter means is a disk-shaped filter.

11. The fitting of claim 3, wherein said fitting cryogenic/sampling conduit means comprises a valved conduit and valve means for closing and opening said valved conduit.

12. The fitting of claim 3, wherein said drilling means comprises a drill bit and said hole cutting means comprises an annular cutting sleeve, cutting teeth, and a spring member disposed on said drill bit.

13. The fitting of claim 3, wherein said cap member further comprises cap member attachment means for securing said cap member to said fitting.

14. The fitting of claim 3, wherein the diameter of said pressure balancing bore is less than the diameter of said evacuation/pressurization conduit means.

15. The fitting of claim 3, wherein said sealing means comprises a wax layer disposed on said hole cutting means.

16. The fitting of claim 2, wherein said cryogenic/sampling conduit means bypasses said filter means.

17. The fitting of claim 16, wherein said cryogenic/sampling conduit means bypasses said filter means passes through said drilling means.

18. The fitting of claim 16, wherein said drilling means comprises a drill bit and wherein said cryogenic/sampling conduit means comprises a valved conduit, an axial bore disposed within said drill bit, and a radial aperture disposed within said drill bit.

19. The fitting of claim 2, wherein said fitting attachment means comprises self-tapping threading.

20. The fitting of claim 2, wherein said venting conduit means comprise vent ports and annular venting chambers.

21. The fitting of claim 20, wherein said venting conduit means comprises an upper annular venting conduit and a lower annular venting conduit, and wherein said filter means is disposed between said upper annular venting conduit and said lower annular venting conduit.

22. The fitting of claim 21, wherein said filter means is a disk-shaped filter.

23. The fitting of claim 2, wherein said cryogenic/sampling conduit means comprises a valved conduit and valve means for closing and opening said valved conduit.

24. The fitting of claim 2, wherein said drilling means comprises a drill bit and said hole cutting means comprises an annular cutting sleeve, cutting teeth, and a spring member disposed on said drill bit.

25. The fitting of claim 2, wherein said sealing means comprises a wax layer disposed on said hole cutting means.

26. The fitting of claim 1, further comprising a cap member adapted to be secured to the fitting, said cap member comprising:

evacuation/pressurization conduit means in fluid communication with said venting conduit means of said fitting;

evacuation/pressurization connection means for joining said cap member to an evacuation or pressurization means;

cryogenic/sampling conduit means in fluid communication with said cryogenic/sampling conduit means of said fitting;

cryogenic/sampling connection means for joining said cap member to a cryogenic source or sampling means; and a pressure balancing bore in fluid communication with said evacuation/pressurization conduit means and opening external to said cap member through which gases external to said fitting can be drawn during evacuation of said drum or through which pressurized gas can be expelled during pressurization of said drum.

27. The fitting of claim 26, wherein said cryogenic/sampling conduit means bypasses said filter means.

28. The fitting of claim 26, further comprising fitting attachment means for securing said fitting to the drum, wherein said fitting attachment means comprises self-tapping threading.

29. The fitting of claim 26, wherein said venting conduit means comprise vent ports and annular venting chambers.

30. The fitting of claim 29, wherein said venting conduit means comprises an upper annular venting conduit and a lower annular venting conduit, and wherein said filter means is disposed between said upper annular venting conduit and said lower annular venting conduit.

31. The fitting of claim 30, wherein said filter means is a disk-shaped filter.

32. The fitting of claim 26, wherein said fitting cryogenic/sampling conduit means comprises a valved conduit and valve means for closing and opening said valved conduit.

33. The fitting of claim 26, wherein said cap member further comprises cap member attachment means for securing said cap member to said fitting.

34. The fitting of claim 3, wherein the diameter of said pressure balancing bore is less than the diameter of said evacuation/pressurization conduit means.

35. The fitting of claim 1, wherein said cryogenic/sampling conduit means bypasses said filter means.

36. The fitting of claim 1, further comprising fitting attachment means for securing said fitting to the drum, wherein said fitting attachment means comprises self-tapping threading.

37. The fitting of claim 1, wherein said venting conduit means comprise vent ports and annular venting chambers.

38. The fitting of claim 37, wherein said venting conduit means comprises an upper annular venting conduit and a lower annular venting conduit, and wherein said filter means is disposed between said upper annular venting conduit and said lower annular venting conduit.

39. The fitting of claim 38, wherein said filter means is a disk-shaped filter.

40. The fitting of claim 1, wherein said cryogenic/sampling conduit means comprises a valved conduit and valve means for closing and opening said valved conduit.

* * * * *